US010237931B2

(12) United States Patent
Zhang

(10) Patent No.: US 10,237,931 B2
(45) Date of Patent: Mar. 19, 2019

(54) REGULATED POWER SUPPLY VOLTAGE AND TRIAC HOLD-UP CURRENT FOR A SWITCHING POWER CONVERTER

(71) Applicant: DIALOG SEMICONDUCTOR INC., Campbell, CA (US)

(72) Inventor: Chenglong Zhang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/948,713

(22) Filed: Apr. 9, 2018

(65) Prior Publication Data
US 2018/0227993 A1    Aug. 9, 2018

Related U.S. Application Data

(63) Continuation of application No. PCT/US2015/057258, filed on Oct. 23, 2015.

(51) Int. Cl.
*H02M 1/00* (2006.01)
*H05B 33/08* (2006.01)
*H02M 3/156* (2006.01)

(52) U.S. Cl.
CPC ........ *H05B 33/0815* (2013.01); *H02M 3/156* (2013.01); *H05B 33/0845* (2013.01); *H02M 2001/0006* (2013.01); *H02M 2001/0009* (2013.01); *Y02B 20/347* (2013.01)

(58) Field of Classification Search
None
See application file for complete search history.

(56) References Cited

U.S. PATENT DOCUMENTS

| 8,816,597 B2* | 8/2014 | Suzuki | H05B 33/0809 |
| | | | 315/291 |
| 9,018,851 B1* | 4/2015 | Melanson | H05B 33/0815 |
| | | | 315/185 S |
| 9,686,834 B2* | 6/2017 | Wang | H05B 33/0845 |
| 9,692,316 B1* | 6/2017 | Ryu | H05B 33/0815 |
| 2009/0322306 A1 | 12/2009 | Warrington et al. | |
| 2014/0339995 A1 | 11/2014 | Zanbaghi et al. | |
| 2014/0346874 A1 | 11/2014 | Fang et al. | |
| 2015/0257216 A1 | 9/2015 | Lys et al. | |

FOREIGN PATENT DOCUMENTS

| EP | 2 892 137 A1 | 7/2015 |
| WO | WO 2011/051859 A1 | 5/2011 |

OTHER PUBLICATIONS

PCT Search Report and Written Opinion dated Jul. 19, 2016 from corresponding International Application No. PCT/US2015/057258 filed Oct. 23, 2015.
Second Written Opinion dated Oct. 6, 2017 from corresponding International Application No. PCT/US2015/057258 filed Oct. 23, 2015.
International Preliminary Report on Patentability dated Jan. 17, 2018 from corresponding International Application No. PCT/US2015/057258 filed Oct. 23, 2015.

* cited by examiner

*Primary Examiner* — Minh D A
*Assistant Examiner* — James H Cho
(74) *Attorney, Agent, or Firm* — Haynes and Boone, LLP

(57) ABSTRACT

A switching power converter is provided that includes a current source that controls the charging of a storage capacitor to provide a regulated internal power supply voltage.

8 Claims, 3 Drawing Sheets

REGULATED POWER SUPPLY VOLTAGE AND TRIAC HOLD-UP CURRENT FOR A SWITCHING POWER CONVERTER

CROSS-REFERENCE TO RELATED APPLICATIONS

This application is a continuation of International Application No. PCT/US2015/057258 filed Oct. 23, 2015, which is hereby incorporated by reference in its entirety.

TECHNICAL FIELD

This application relates to switching power converters, and more particularly to the regulation of a power supply voltage for a switching power converter while maintaining sufficient triac hold-up current.

BACKGROUND

Due to their advantageous low power consumption and lack of toxic materials, solid state light emitting diode (LED) lighting applications are rapidly replacing conventional incandescent and florescent lighting systems. However, an LED cannot be exposed to the AC mains like an incandescent bulb. Solid state lighting applications thus include a switching power converter to convert the AC input voltage into a rectified output voltage that may power the LED. It is also conventional for incandescent light bulbs to be powered through a dimmer switch that includes a triac. The triac requires a minimum level of current known as the holding current for its operation. In an incandescent application, the bulb directly connects to the dimmer such that there is no issue with regard to supporting the triac holding current.

Since the users expect an LED to mimic the behavior of incandescent bulbs, the corresponding switching power converter needs to support the required holding current. It is thus conventional for solid state lighting (SSL) switching power supplies to include a bleeder circuit that is active during periods of applied dimming through the dimming switch. The bleeder circuit conducts sufficient current despite the application of dimming so that the triac in the dimmer for the SSL switching power converter conducts its required holding current.

To supply the internal power supply voltage, conventional SSL switching power converters may include a switch that couples a storage capacitor through a resistance to a charged node. Since the internal power supply voltage is commonly denoted as VCC, the corresponding switch is designated herein as the VCC switch to distinguish it from the power switch that the switching power converter cycles to regulate the output voltage. The VCC voltage drops when the VCC switch is cycled off by a product of the charging current drawn by and an equivalent series resistance (ESR) for the storage capacitor. If the capacitor ESR and charging current product is large, the VCC voltage may drop below a minimum required value such that the power converter performs a power on reset (POR). The storage capacitor may then be charged back, whereupon the VCC switch is cycled off and the VCC voltage again drops below the minimum required value. The result is that the LED bulb powered by the corresponding SSL switching power converter is unable to properly startup.

Accordingly, there is a need in the art for a switching power converter with an improved regulation of the internal power supply voltage.

SUMMARY

A switching power converter is provided that includes a power switch controlled by a controller to regulate an output voltage. The controller is powered by an internal power supply voltage. To provide a stable startup for the internal power supply voltage, the switching power converter includes a current mirror that controls a current charging a storage capacitor. The internal power supply voltage is provided by the charged storage capacitor.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
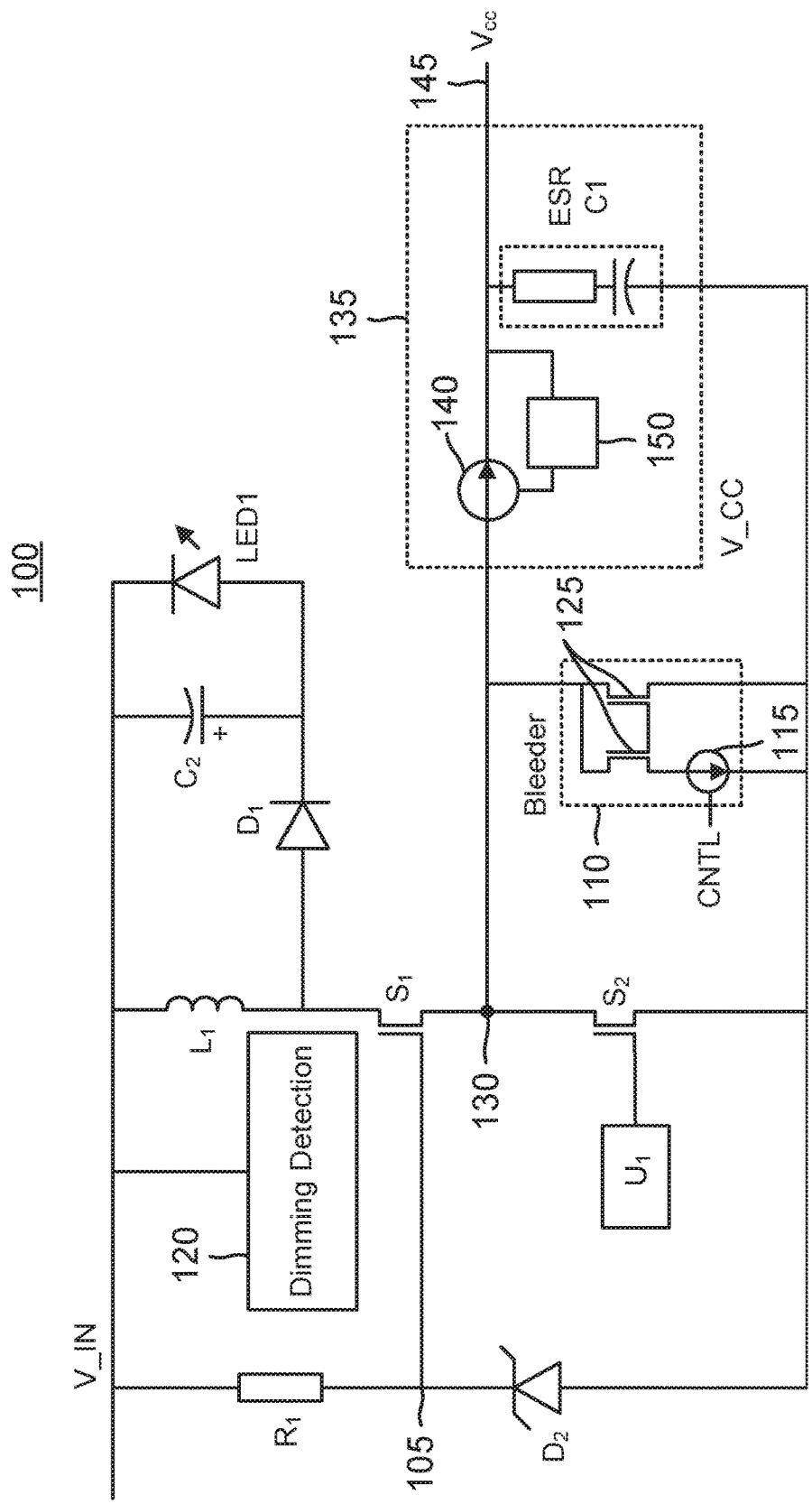
FIG. 1 is a circuit diagram of an example switching power converter in accordance with an aspect of the disclosure.

To address the need for improved regulation of the internal power supply voltage, a switching power converter is provided with a controlled current source configured to charge a storage capacitor to provide the internal power supply voltage. The storage capacitor is thus charged at a rate that is substantially independent of the voltage applied to the controlled current source. In this fashion, the switching power converter is provided a stable internal power supply voltage to ensure that a startup and subsequent operation may be achieved without power on resets being triggered as the internal power supply voltage is maintained above a power-on-reset-triggering level.

Turning now to the drawings, an example buck-boost converter 100 is illustrated. However, it will be appreciated that the circuits and methods discussed herein may be applied to a diverse array of alternative switching converter topologies such as a flyback converter or a buck converter. A rectified input voltage V_IN is received at a first terminal of an inductor L1 and a resistor R1. For example, a bridge rectifier (not illustrated) or other suitable AC-to-DC rectifier may rectify the AC input voltage from an AC mains to provide a rectified input voltage that is also processed by a phase-cut dimming switch (not illustrated) to produce rectified input voltage V_IN.

Power converter 100 includes a cascode transistor S1 (e.g., an NMOS transistor) that has its gate coupled to a second terminal of resistor R1 at a node 105. The source of cascode transistor S1 couples to a node 130 that in turn couples to a drain of a power switch transistor S2 (e.g., another NMOS transistor) having a gate voltage controlled by a controller U1. The source for power switch transistor S2 couples to ground. Controller U1 is configured to control a cycling of power switch S2 to regulate the amount of current pulsed into at least one LED (LED1). Output filtering is provided by an output capacitor C2 that couples in parallel with LED1 and also by a load diode D1 that couples between a drain for cascode transistor S1 and a second terminal for inductor L1. Node 105 also couples to a zener diode D2 that in turn couples to ground. When the rectified input voltage V_IN is initially applied at startup of power converter 100, the voltage of node 130 will equal the zener breakdown voltage for zener diode D2 minus a gate-to-source voltage for cascode transistor S1.

Cascode transistor S1 isolates power switch S2 from the relatively high voltage for rectified input voltage V_IN. Should a user apply dimming through a dimmer switch including a triac, the triac will require a sufficient holding current. To maintain this minimum holding current while dimming is applied, power converter 100 includes a bleeder circuit 110. For example, bleeder circuit 110 may include a current source 115 that is controlled by a control signal CNTL. In that regard, it is conventional for a switching power converter such as power converter 100 to include a dimming detection circuit 120 that detects whether a phase cut dimming has been applied to the AC input voltage from which rectified input voltage V_IN is sourced. Dimming detection circuit 120 may be configured to assert control signal CNTL to trigger bleeder circuit 110 by switching on current source 115. For example, bleeder circuit 110 may include a current mirror formed by transistors 125 that each have a drain coupled to node 130.

An internal power supply regulator 135 regulates an internal power supply voltage VCC through a current source 140 that couples between node 130 and an output node 145 carrying the internal supply voltage VCC. A storage capacitor C1 having an equivalent series resistance (ESR) has a first terminal coupled to output node 145 and a second terminal coupled to ground. A feedback circuit 150 is configured to switch current source 140 off once the internal supply voltage VCC has reached the desired operating level. It will be appreciated that current source 140 may instead be coupled to storage capacitor C1 through a switch that is regulated by feedback circuit 150.

Figure 2:
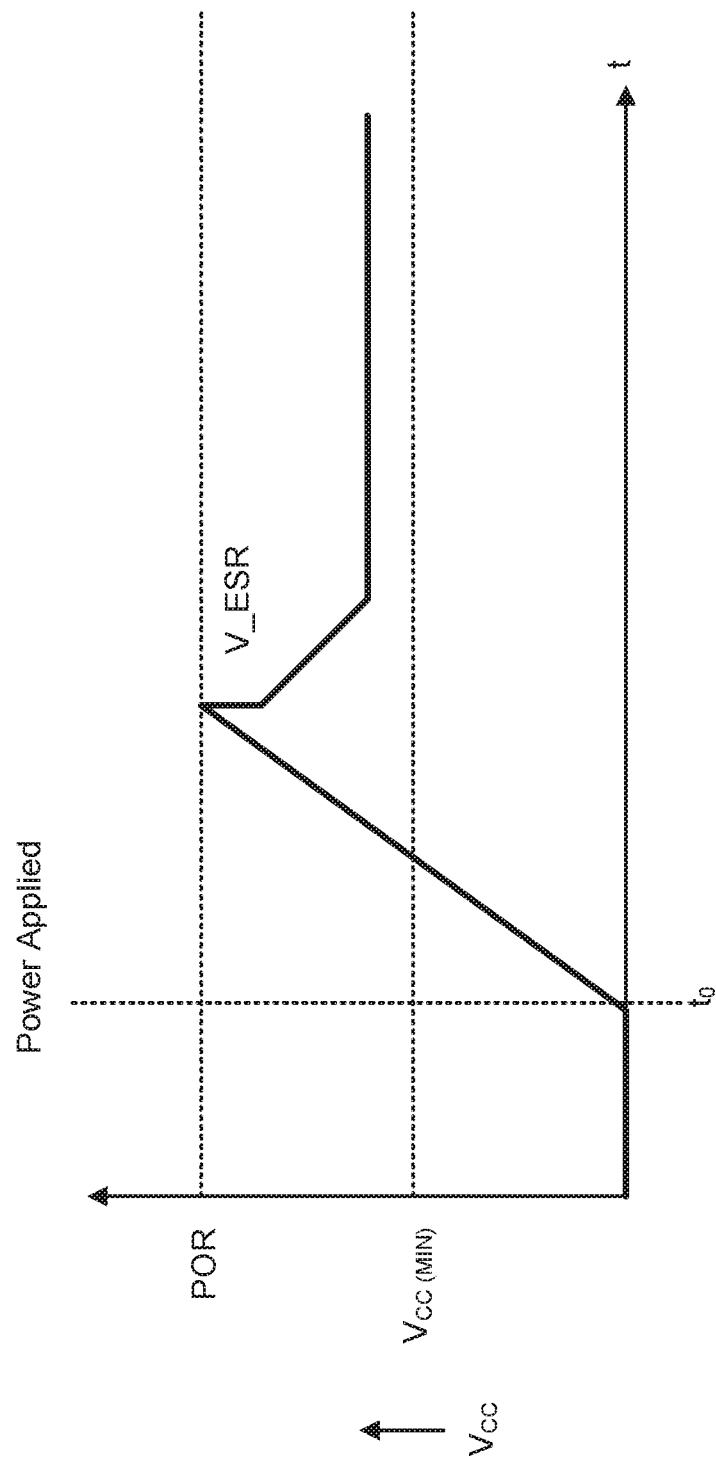
FIG. 2 illustrates a startup waveform for the internal power supply voltage for the switching power converter of FIG. 1.

Advantageously, the charging rate of storage capacitor C1 is substantially independent of the voltage for node 130. Depending upon the breakdown voltage for zener diode D2, the voltage of node 130 will generally be around 12 to 18 volts upon startup. Current source 140 charges storage capacitor C1 at substantially the same rate regardless of the voltage for node 130. For example, a power on reset cycle for the internal power supply voltage is illustrated in FIG. 2. Power is applied at time to, whereupon the internal power supply voltage VCC is charged at a rate determined by the current supplied by current source 140 and the capacitance of storage capacitor C1. When the desired (POR) level is reached for voltage VCC, current source 140 is switched off or otherwise prevented from charging storage capacitor C1 such as through the opening of a switch to stop the charging of the storage capacitor C1. Power converter 100 continues to draw an operating current such that voltage VCC then declines. But since voltage VCC was not increased at a relatively fast rate, its decline is also gradual such that voltage VCC does not fall below the required minimum value. In this fashion, startup proceeds normally and is not vexed by repeated resets as may happen in conventional architectures.

Figure 3:
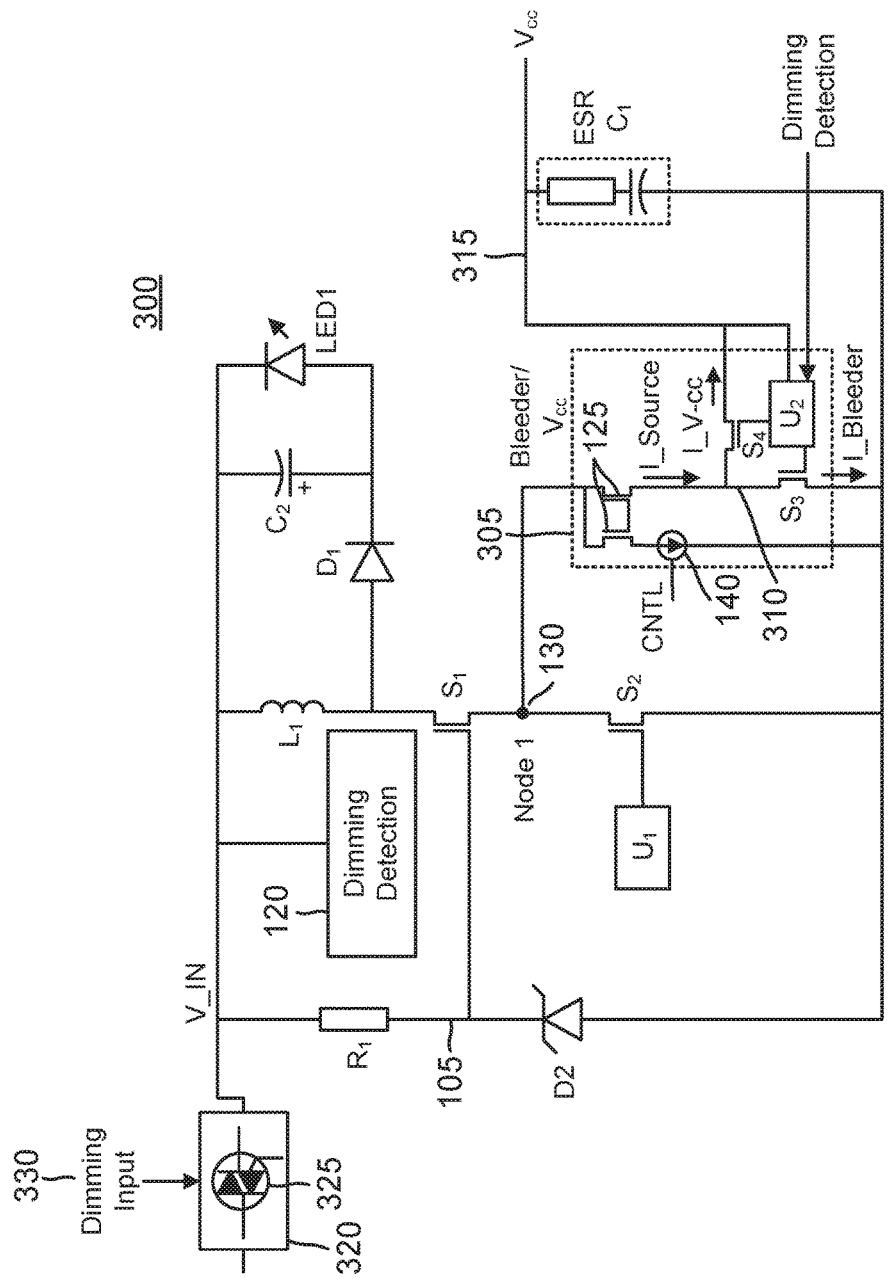
FIG. 3 is a circuit diagram of an example switching power converter in accordance with an aspect of the disclosure.

An alternative embodiment for a switching power converter 300 is shown in FIG. 3. Inductor L1, output diode D1 and capacitor C2, LED1, dimming detection circuit 120, resistor R1, zener diode D2, controller U1, power switch S2, and cascode transistor S1 are all arranged as discussed with regard to power converter 100. However, power converter 300 includes a combined bleeder and internal voltage regulator circuit 305. Combined circuit 305 includes current source 140 and the current mirror formed through transistors 125. However, a current mirror current I_Source couples to ground through a bleeder switch transistor S3 controlled by a controller U2. In particular a source of one of the current mirror transistors 125 couples to a node 310 that in turn couples to a drain for bleeder switch transistor S3. A regulator switch transistor S4 also couples between node 310 and an output node 315 carrying the internal power supply voltage VCC. Storage capacitor C1 having an equivalent series resistance ESR couples between output node 315 and ground. Power converter 300 thus advantageously conserves component cost by using current source 140 for both bleeder and voltage regulating purposes.

Controller U2 regulates a switching rate for regulator switch transistor S4 to regulate internal power supply voltage VCC to the desired value. In particular, regulator switch transistor S4 conducts a current I_VCC that is greater than a bleeder current I_Bleeder that is conducted by bleeder switch transistor S3. A dimming switch 320 includes a triac 325 controlled by a user's dimming input 330. Should a user apply dimming through dimming input 330, controller U2 responds to a dimming detection by dimming circuit 120 to ensure that a sufficient holding current is drawn through triac 325. For example, controller U2 may be configured to respond to the dimming detection by merely cycling regulator switch transistor S4 while the internal power supply voltage VCC is less than a maximum amount. This reduces power dissipation and improves operational efficiency. Should no dimming be detected, controller U2 maintains bleeder switch transistor S3 off. On the other hand, should dimming be detected but the power supply voltage VCC is already at or near its maximum level, controller U2 may cycle bleeder switch transistor S3 while maintaining regulator switch transistor S4 off. If no dimming is detected but the internal power supply voltage VCC require boosting, controller U2 may again cycle regulator switch transistor S4 while maintaining bleeder switch transistor S3 off.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A method, comprising:
while a phase-cut dimmer switch operates to dim a lighting from an LED powered by a switching power converter;
sourcing a current through a current source into a first node;
responsive to an internal power supply voltage being below a maximum level, switching on a first switch connected between the first node and a storage capacitor to maintain a bleed current for the phase-cut dimmer switch until the storage capacitor is charged to a desired level for the internal power supply voltage;
responsive to the internal power supply voltage being at or above the maximum level, switching on a second switch connected between the first node and ground to maintain the bleed current for the phase-cut dimmer switch; and regulating an output voltage for the switching power converter by cycling a power switch coupled to a rectified input voltage.

2. The method of claim 1, wherein sourcing the current through the current source comprises sourcing the current through a current mirror.

3. A switching power converter, comprising:
a current mirror configured to drive a current into a first node;
a storage capacitor for storing a power supply voltage;
a first switch connected between the first node and the storage capacitor;
a second switch connected between the first node and ground;
a dimming detector configured to detect a dimming from a phase-cut dimmer switch; and
a controller powered by the power supply voltage, the controller being configured to switch on the first switch and to switch off the second switch responsive to the power supply voltage being below a maximum level and to a dimming detection by the dimming detector and to switch off the first switch and switch on the second switch responsive to the power supply voltage being at or above the maximum level and to the dimming detection by the dimming detector.

4. The switching power converter of claim 3, further comprising:
a power switch;
an inductor having a first terminal coupled to an input node;
a cascode transistor coupled between the inductor and the power switch;
a resistor coupled between the input node and a second node; and
a zener diode coupled between the second node and ground, wherein the second node is coupled to a gate of the cascode transistor.

5. The switching power converter of claim 4, further comprising an LED coupled to the input node.

6. (The switching power converter of claim 4, wherein the power switch comprises an NMOS transistor.

7. The switching power converter of claim 4, wherein the power switch comprises a bipolar junction transistor.

8. The switching power converter of claim 5, further comprising an output diode coupled between the LED and a second terminal for the inductor.

* * * * *

UNITED STATES PATENT AND TRADEMARK OFFICE
CERTIFICATE OF CORRECTION

Page 1 of 1

PATENT NO. : 10,237,931 B2
APPLICATION NO. : 15/948713
DATED : March 19, 2019
INVENTOR(S) : Chenglong Zhang It is certified that error appears in the above-identified patent and that said Letters Patent is hereby corrected as shown below:

In the Claims

In Column 6, Line 17, Claim 6, change as follows:
6. (The switching power converter of Claim 4, wherein the power switch comprises an NMOS transistor.

Should read as follows:
6. The switching power converter of Claim 4, wherein the power switch comprises an NMOS transistor.

Signed and Sealed this
Eighteenth Day of June, 2019

Andrei Iancu
*Director of the United States Patent and Trademark Office*